US009298917B2

(12) United States Patent
Uner et al.

(10) Patent No.: US 9,298,917 B2
(45) Date of Patent: Mar. 29, 2016

(54) ENHANCED SECURITY SCADA SYSTEMS AND METHODS

(75) Inventors: Eric Ridvan Uner, Carpentersville, IL (US); Joshua Scott Matthews, Baltimore, MD (US); Benjamin James Leslie, Enmore (AU); Anthony Kobrinetz, Hoffman Estates, IL (US); Martin H. Singer, Northbrook, IL (US)

(73) Assignee: Redwall Technologies, LLC, Beavercreek, OH (US)

( * ) Notice: Subject to any disclaimer, the term of this patent is extended or adjusted under 35 U.S.C. 154(b) by 55 days.

(21) Appl. No.: 13/350,599

(22) Filed: Jan. 13, 2012

(65) Prior Publication Data

US 2013/0081103 A1 Mar. 28, 2013

Related U.S. Application Data

(60) Provisional application No. 61/539,801, filed on Sep. 27, 2011.

(51) Int. Cl.
*G06F 21/56* (2013.01)
*G06F 21/57* (2013.01)

(52) U.S. Cl.
CPC .............. *G06F 21/56* (2013.01); *G06F 21/577* (2013.01)

(58) Field of Classification Search
CPC ... H04L 1/1664; H04L 1/1671; H04L 1/1685; H04L 1/1692; H04L 12/2467; H04L 12/26; H04L 12/2686; H04L 43/08; H04L 43/14; H04L 67/322; H04M 3/22; G05B 19/418; G06F 21/00
USPC ........................................................... 726/1
See application file for complete search history.

(56) References Cited

U.S. PATENT DOCUMENTS

| 6,067,477 | A | * | 5/2000 | Wewalaarachchi .. G05B 19/418 700/17 |
| 6,477,434 | B1 | * | 11/2002 | Wewalaarachchi et al. .... 700/83 |
| 6,671,809 | B1 | | 12/2003 | Perona et al. |
| 6,934,857 | B1 | | 8/2005 | Bartleson et al. |
| 7,171,690 | B2 | | 1/2007 | Kouznetsov et al. |
| 7,246,156 | B2 | * | 7/2007 | Ginter et al. .................. 709/217 |
| 7,283,820 | B2 | | 10/2007 | Kamijo et al. |
| 7,401,230 | B2 | | 7/2008 | Campbell et al. |
| 7,634,559 | B2 | | 12/2009 | Brown |
| 7,665,125 | B2 | | 2/2010 | Heard et al. |
| 8,402,267 | B1 | * | 3/2013 | Graham .................. G06F 21/53 713/164 |
| 2003/0041255 | A1 | | 2/2003 | Chen et al. |

(Continued)

FOREIGN PATENT DOCUMENTS

WO    2010151859 A1   12/2010

*Primary Examiner* — Krista Zele
*Assistant Examiner* — Tariq Najee-Ullah
(74) *Attorney, Agent, or Firm* — Wood, Herron & Evans, LLP

(57) ABSTRACT

A system and method for a secure supervisory control and data acquisition (SCADA) system. Secure SCADA elements (SSEs) have individual system security monitoring and enforcement of policies throughout the SCADA system. And isolation core ensures that a system security monitor monitors and takes appropriate action with respect to untrusted applications that may impact an SSE. The system security server provides policy enforcement on all of the SSEs that exist on the system. New security policies are created that are populated to individual SSEs in the system. Biomorphing algorithms allow for system uniqueness to be derived over time further enhancing security of SSEs.

28 Claims, 7 Drawing Sheets

(56) References Cited

U.S. PATENT DOCUMENTS

| | | |
|---|---|---|
| 2004/0010703 A1 | 1/2004 | Kouznetsov et al. |
| 2005/0005152 A1 | 1/2005 | Singh et al. |
| 2005/0202803 A1 | 9/2005 | Mahalal |
| 2006/0075488 A1 | 4/2006 | Barrett et al. |
| 2007/0006159 A1 | 1/2007 | Hecht et al. |
| 2007/0177611 A1 | 8/2007 | Armstrong et al. |
| 2007/0204125 A1 | 8/2007 | Hardy |
| 2007/0294369 A1* | 12/2007 | Ginter .................... G06F 21/55 709/217 |
| 2008/0086776 A1 | 4/2008 | Tuvell et al. |
| 2010/0023598 A9* | 1/2010 | Ginter et al. .................. 709/217 |
| 2010/0199086 A1 | 8/2010 | Kuang et al. |
| 2011/0126111 A1* | 5/2011 | Gill ........................ G06F 21/55 715/736 |
| 2012/0117266 A1* | 5/2012 | Maria .......................... 709/232 |
| 2012/0216243 A1* | 8/2012 | Gill ........................ G06F 21/55 726/1 |

\* cited by examiner

ENHANCED SECURITY SCADA SYSTEMS AND METHODS

CROSS-REFERENCE TO RELATED APPLICATION

This application claims the benefit of priority to U.S. Provisional Application No. 61/539,801 filed Sep. 27, 2011, the entire contents of which is incorporated herein by reference.

FIELD OF THE INVENTION

This invention relates generally to a secure SCADA (Supervisory Control And Data Acquisition) system. In particular, the invention relates to a system and method for resisting malicious code from tampering with or otherwise exploiting a SCADA system.

BACKGROUND OF THE INVENTION

SCADA (Supervisory Control and Data Acquisition) generally refers to industrial control systems. SCADA systems monitor and control industrial, infrastructure processes and equipment, such as those involved in refining, water treatment, manufacturing, production, and power generation. Because SCADA systems often control Critical National Infrastructure (CNI) elements ranging from nuclear power plants to flood gates, they are seen as prime cyber-terrorism targets. While in the past, various components of SCADA systems were connected only over short serial connections, as both the components of SCADA systems and the protocols they use to communicate have become standardized, they have also become increasingly connected over shared and disparate networks, including the internet. This increased connectivity has given adversaries new attack vectors against these critical systems.

SCADA systems typically include one or more of the following elements: (1) a supervisory computer system, gathering data on the process and sending commands to control to the process, (2) Programmable Logic Controllers (PLCs), which are essentially small computers used to control electromechanical processes (e.g., to switch something on or off, to control a valve, etc.), (3) Remote Terminal Units (RTUs) which convert sensor signals to digital data and send digital data to the supervisory system, and (4) a Human-Machine Interface (HMI) which presents process data to a human operator, and allows the operator to issue commands.

These SCADA elements communicate with each other over wired and/or wireless networks, including IP-based networks over various transports. SCADA elements may communicate over shared or disparate networks and may utilize Web protocols for communication and display of data.

SUMMARY

Embodiments include a method of operating a SCADA element in a first security mode defined by a first security policy that comprises monitoring applications, processes and tasks that access a processor of the SCADA element; determining one or more violations of the first security policy by an application, process or task; and taking a graduated action pursuant to the first security policy in response to the detection of one or more violations. The SCADA element may be, for example, a supervisory computer system, a programmable logic controller, a remote terminal unit, and a human-machine interface.

Further embodiments include a method of managing the security posture of a plurality of SCADA elements over a communication network that comprises storing a plurality of security policies in a security policy library; and transmitting all or a portion of at least one security policy to at least one SCADA element over the communication network.

Further embodiments include a secure SCADA system that comprises a system security server coupled to a communications network; and a SCADA element configured to communicate with the system security server over the communications network, wherein the SCADA element comprises: a memory and a processor coupled to the memory and configured with processor-executable instructions to perform operations including monitoring applications, processes and tasks that access the processor; determining one or more violations of a first security policy stored on the SCADA element by an application, process or task; and taking a graduated action pursuant to the first security policy in response to the detection of one or more violations. In embodiments, the system security server may comprise a memory a processor coupled to the memory and configured with processor-executable instructions to perform operations including storing a plurality of security policies in a security policy library; and transmitting all or a portion of at least one security policy to at least one SCADA element over the communication network.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the various embodiments.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments relate to systems and methods for resisting malicious code from tampering with or otherwise exploiting a SCADA (Supervisory Control and Data Acquisition) system. According to various embodiments, secure SCADA element(s) (SSE) may operate in a manner that assures the user that it has not been tampered with by malicious code of various types. At the same time, the various embodiments allow for the SSE to operate on existing hardware using existing firmware. Various embodiments provide an enhanced security SSE having the ability to, for example, internally monitor activities of any function of the SSE; report on suspicious activity on the SSE by any function or program to a central server; apply a series of protective measures that reside internally on the SSE when suspicious activity is detected; and take advantage of threat libraries and policies residing on a security system server that update individual SSEs as needed.

In the various embodiments illustrated herein the SSE does not require special user interaction in order to have the SSE operate in a secure fashion.

Figure 1:
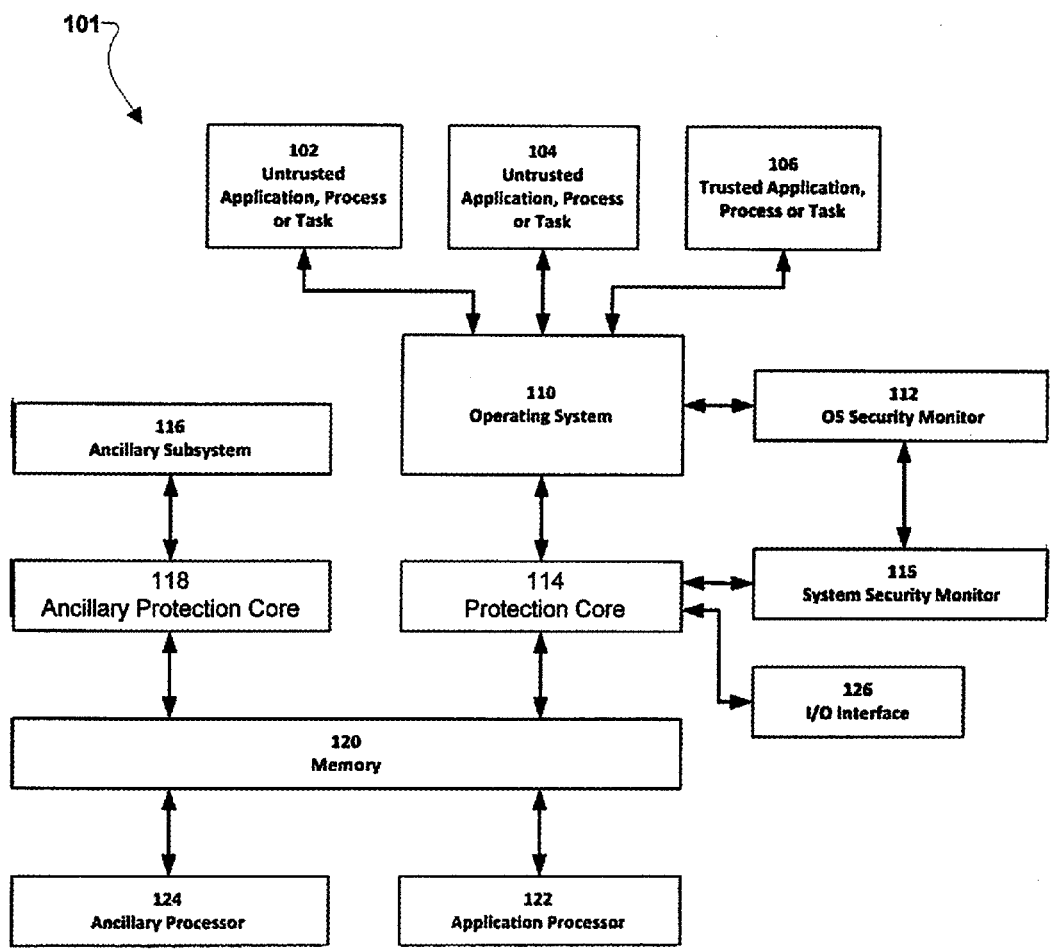
FIG. 1 is a system block diagram illustrating a secure SCADA element (SSE) according to an embodiment.
Figure 2:
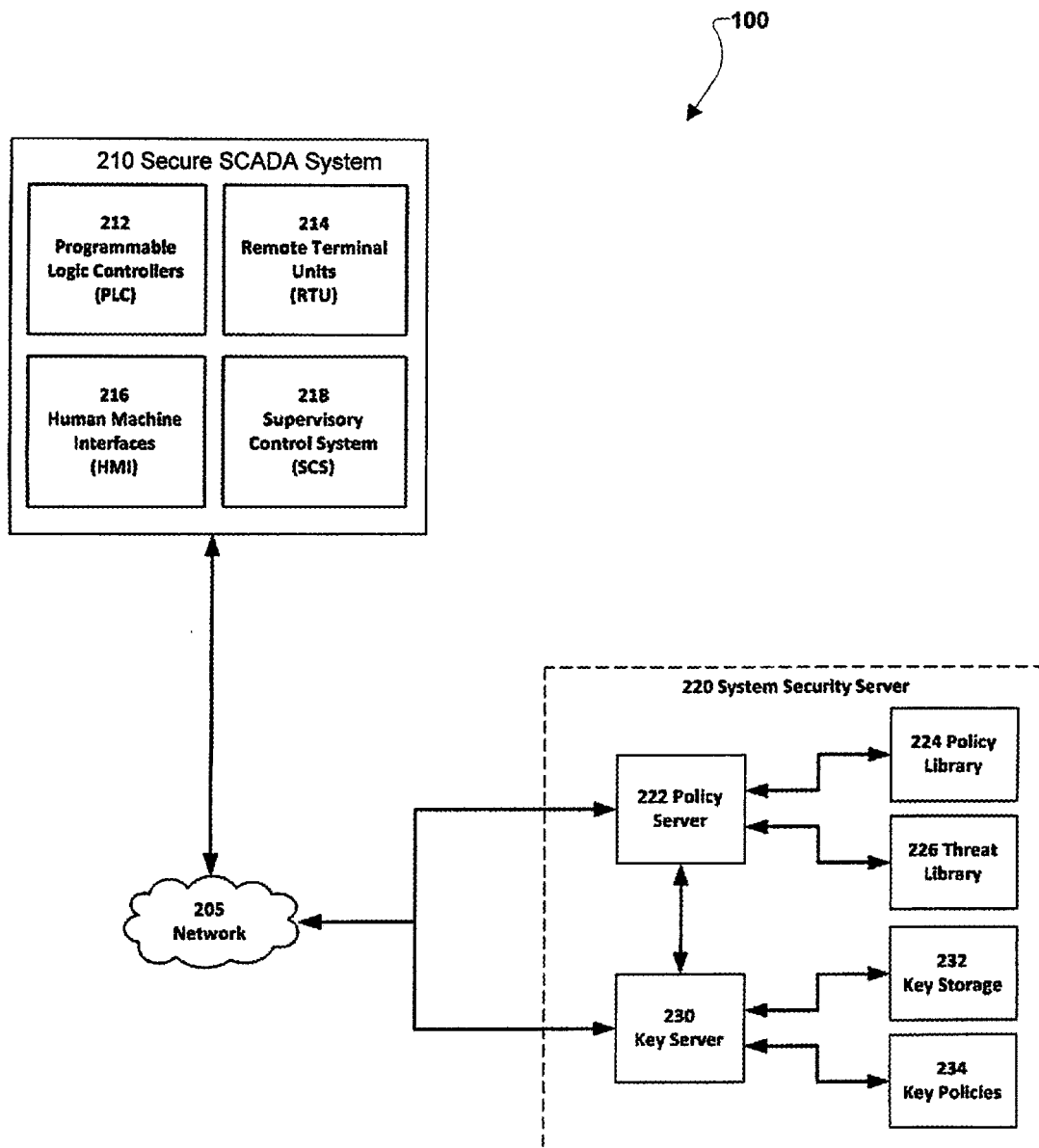
FIG. 2 schematically illustrates a conceptual SSE and server support architecture.

Referring to FIGS. 1-2, a secure SCADA system 100 according to one embodiment is illustrated. FIG. 1 illustrates the architecture of an exemplary secure SCADA element 101, which typically includes a processor coupled to a memory, and may be a Supervisory Control System (SCS), a Programmable Logic Controller (PLC), a Remote Terminal Unit (RTU), and/or a Human-Machine Interface (HMI), as described above. The secure SCADA element 101 may include a complete SCADA system.

FIG. 2 illustrates a plurality of SCADA elements, including a PLC 212, an RTU 214, an HMI 216, and an SCS 218, that may communicate over a communication network 205 with one or more system security server(s) 220. The communication network 205 may be, for example, a local area network, wide area network such as the Internet, a cellular telephone network, a Wi-Fi network, a satellite or radio network, or combinations of various wired and/or wireless networks.

In embodiments, a secure SCADA system 220 may be an comprised of one or more PLCs 212, RTUs 214 and HMIs 216 under the control of a Supervisory Control System 218. In some embodiments, the various SCADA elements 212, 214, 216, 218 may be combined in an integrated system that may communicate over the communication network 205 with a system security server 220. In other embodiments, the SCADA system 220 may be a distributed system with various SCADA elements 212, 214, 216, 218 communicating with each other and with the system security server 220 over the communication network 205.

The system security server 220, which typically includes a processor coupled to a memory and may also include a number of connector ports coupled to the processor for establishing data connections the network 106, may in accordance with various aspects of the invention store policies, commands, cryptographic data, such as key data, as well as other data for a plurality of SCADA elements as is described in further detail below.

Each SSE 212, 214, 216, 218 may store in memory a set of policies and/or data, which may or may not be distinct from the policies and/or data stored on other SSEs or in other SCADA systems. Each SSE may also be configured to continuously interpret and process commands received from the system security server 220, which may include commands to update one or more policies.

The precise manner in which the respective SSEs and the at least one system security server 220 are connected via communication network 205 is not critical to the various embodiments. In some embodiments, it may not be required for the SSE and the system security server 220 to communicate at all after an initial provisioning process and the initial provisioning process can be performed through a proxy or physical transfer.

Typical SSEs 101 for use with the various embodiments will have in common the components illustrated in FIG. 1. For example, the exemplary SSE 101 may include a processor 122 coupled to internal memory 120. The processor 122 may be any programmable microprocessor, microcomputer or multiple processor chip or chips that can be configured by software instructions (applications) to perform a variety of functions, including the functions of the various embodiments described herein. Typically, software applications 102, 104, 106 may be stored in the internal memory 120 before they are accessed and loaded into the processor 122.

The SSE 101 may further include an operating system (OS) 110, which, as is known in the art, may manage various resources of the device and provide a software platform upon which other programs (e.g., applications) may run. The OS 110 may include a kernel, and may be a security-enhanced OS having an OS security monitor 112, as is described in further detail below.

In various embodiments, the SSE 101 includes a protection core 114, which may be implemented in software, and which conceptually constitutes a small, efficient separation layer that resides between the security-enhanced OS 110 and the processor 122. The protection core 110 may operate to control access to resources and schedule execution of trusted elements. There may be one or more protection cores, with one for each processor or processor core.

The protection core 114 may include a system security monitor 115 that monitors all applications, processes and tasks 102, 104, 106 that access the processor 122. The system security monitor 115 may comprise a series of rules and policies implemented on a processor that are initially loaded in the system security monitor 115 when the SSE is first provisioned. Thereafter, the system security monitor 115 may receive additional policies and rules from the network or a local authenticated source such as an SD card or direct entry. Thereafter, the system security monitor 115 may monitor all applications, processes and tasks that are running in accordance with any new policies or rules.

In the event of a violation of security rules or detection of a suspicious application, process or task behavior 102, 104, 106, is found, the system security monitor 115 may notify the protection core 114 to take appropriate "graduated" action according to rules implemented by a processor depending on the violation of security policy. Such graduated action may comprise disabling a particular SSE, a part of a SSE or shutting down the entire secure SCADA system.

When an application, process or task 102, 104, 106 is loaded in a SSE, the application, process or task may be treated as untrusted and monitored closely by the system security monitor 115 for application, process or task activity and what parts of the SSE are accessed by what parts of the application, process or task and what is done with any data/information that is accessed.

Based upon scripts/rules associated with security rules and policies in the system security monitor 115, the system security monitor 115 may observe the operations of the application, process or task for any activity that violates any of the security rules in the monitor. The system security monitor 115 may be upgraded from time to time with new security rules and policies as new threats emerge. These rules and policies allow designation of application, process or task activity that is a potential violation of SSE security.

When a violation of a security rule occurs, the system security monitor 115 contains instructions for notifying the protection core 114 of any violation. The protection core 114 may include a series of instructions for taking protective actions in a layered fashion that reflects the threat detected. For example, the protection core 114 may direct that the application, process or task 102, 104, 106 be shut down as one limit and/or the entire secure SCADA system be shut down as another limit. Other actions may be for the SSE to send an alert to the system security server 220 (see FIG. 2) notifying of the violation and providing details of the violation including the application, process or task that triggered the violation, what actions were being attempted and what security countermeasures were triggered.

In embodiments, when a security rule violation is detected by the system security monitor 115, the system security monitor 115 may transmit information on the rule violation to a system security server 220 (FIG. 2), so that further analysis can take place. This transmission information may be (for example only) the name of the application, process or task, identifying information on the application, process or task including manufacturer, what actions the application, process or task is taking on the SSE in question and other information. Thereafter, the system security server 220 may analyze the information and communicate to the SSE 101 what, if any action should be taken.

Various embodiments may also include the transmission of information on any newly loaded applications, processes and tasks 102, 104, 106 to the system security server 220 (FIG. 2). The system security server 220 has a library of trusted and untrusted applications, processes, and tasks for the SSE. If the application, process or task installed is a trusted one, then monitoring is minimal by the system security monitor 115 and the application, process or task can run quickly. If the application, process or task is unknown, the SSE system security monitor 115 may automatically designate the application as untrusted and monitor the application, process or task very closely (e.g., at a higher level of scrutiny than the monitoring of a trusted application, process or task). In addition, if the system security server 220 notifies the SSE that the application, process or task is not secure, then the system security monitor 115 may vigorously monitor the non-secure application, process or task for any "illegal" activity. While this close monitoring may impact the performance of the non-secure application, process or task, the monitoring will result in early detection and reporting of any security rule violations. Further, such close monitoring with no suspicious activity over a period of time can lead to the application, process or task becoming "trusted."

The architecture of the various embodiments of the SSE 101 is illustrated in FIG. 1. In the embodiments illustrated herein, an untrusted application, process or task 102, 104, which may be secure or non-secure, is one that has not been vetted against the secure SCADA system requirements or processes, or is simply untrusted due to the policy in place (e.g. it may be unsigned or signed by an untrusted entity).

A trusted application, process or task 106 is one that, according to the current policy stored in the secure SCADA system, has a higher assurance level than an untrusted application, process or task, and may be granted additional privileges or functions over an untrusted application, process or task. The higher assurance level may be generated by prior testing of the trusted application, process or task at the system security server prior to deployment of the application, process or task on the SSE 101. Also, in embodiments an application may become trusted when it has operated in an untrusted state for a particular period of time on the SSE without exhibiting any suspicious behavior. Trusted applications, processes and tasks 106 generally receive the greatest amount of access to SSE capabilities.

The operating system 110 of the SSE may comprise any suitable OS, for example, Linux, Windows®, a Real-time Operating System (RTOS), or a simple execution loop. The operating system 110 may be augmented with context switch hooks and other Application Programming Interface (API) components to access the secure SCADA features and functions. This provides an enhanced security capability on which other functionalities of the SSE may be built. However this is not meant as a limitation. Other operating systems that will become available that provide enhanced security may also be the subject of additional embodiments is noted herein.

The SSE takes advantage of the capabilities of the OS security monitor 112. The OS security monitor 112 enforces policies in the OS kernel, takes directives from the system security monitor 115, and reports back to the system security monitor 115. In embodiments, the OS security monitor 112 may enforce policies at the low and medium robustness level within the SSE. In embodiments, the OS security monitor 112 resides inside the secure but untrusted operating system 110.

The actions and data of the OS security monitor 112, which may reside in a secure but untrusted operating system 110, may form a first line of defense as part of a secure SCADA software defense-in-depth strategy. Additional security may be provided by the system security monitor 115, which may enforce policies at a high robustness level within the SSE. The system security monitor 115 may operate in accordance with security policies that are installed when the SSE is initially configured or which may be changed and downloaded from the SSE security server 220 (FIG. 2) from time to time as new threats emerge and are identified.

The protection core 114 is a small, efficient intermediate separation layer which controls access to resources and schedules execution of trusted elements. The operation of the protection core 114 is controlled by the application processor 122. There may be more than one isolation core, for example and without limitation, one for each application processor.

The SSE comprises one or more application processors 122. In most cases, the application processor 122 functions in a normal fashion. The application processor 122 interprets and executes the application, process or task, including but not limited to loaded applications, processes, tasks and threads (trusted and untrusted), the SSE operating system 110 including the kernel, device drivers etc., subject to the various policies that are enforced by the system security monitor 115. While a single processor is illustrated, this is not meant as a limitation. Multiple application processors may also be present and are considered within the scope of the various embodiments disclosed herein.

As with any SSE, various embodiments of the SSE also have associated I/O interfaces 126 for connecting devices and networks to the SSE. The devices could be any peripherals or physical interfaces such as network interfaces, alarms, sensors, actuators, microphones, speakers, or the associated chipsets to communicate to these devices.

The various embodiments of the SSE also comprise memory 120. Memory could be RAM or Flash memory storage, or any other permanent or temporary storage.

In addition to a plurality of application processors 122, the SSE may also comprise one or more specialized Ancillary Subsystems 116 such as digital signal processors (DSP), field-programmable gate arrays (FPGA), etc. These specialized subsystems may be too simple to accept the security monitors or other modifications. However, it is anticipated as within the scope of the various embodiments noted herein that these specialized ancillary systems 116 may well comprise their own security monitors with their own policies and applications.

In an embodiment the SSE also comprises a separate protection core associated with the Ancillary Subsystem 116. The Ancillary Protection Core 118 serves the same functions as the Protection Core 114, but may run on a different processor (the Ancillary Processor 124) in order to assure separate monitoring and operations of the Ancillary Isolation Core.

The SSE also comprises an Ancillary Processor 124 as noted above. The Ancillary Processor 124 interprets and executes code for the Ancillary Protection Core 118. The Ancillary Processor could be a separate physical processor, an FPGA, DSP, or a logical separation of processors residing on the application processor.

Further aspects of the SSE 101 and its overall system architecture may include, for example:

Automatic security policy enforcement in the SSE;

Graduated levels of enforcement of security policies;

Updating the system security monitors 115 in all SSEs associated with a system with information about new security threats by adding new rules and policies to the system security monitor 115 via automatic downloading;

Automatic reporting to a system security server 220 (FIG. 2) of any suspicious activity detected by the system security monitor(s) 115 of the overall SCADA system;

A system security server 220 (FIG. 2) that interacts with the SSEs concerning characteristics of non-secure and trusted applications, processes or tasks; and Analysis of the properties of applications, processes and/or tasks that are loaded onto the SSE by the system security server 220 (FIG. 2).

FIG. 2 illustrates an embodiment of a system 100 for implementing security features in a secure SCADA system 210. The system 100 may include one or more SSEs 212, 214, 216, 218, as described above, which may collectively comprise a secure SCADA system 210, as well as a system security server 220.

As described above, the SSE 212, 214, 216, 218 is a device that performs some function in a manufacturing, infrastructure or similar process. In an embodiment the SSE interacts over a wired or wireless network 205 with the System Security Server 220. The System Security Server 220 comprises, either physically or logically, a series of servers and data files that support the secure operation of the SSE.

For example, one component of the System Security Server 220 may be a policy server 222. The policy server 222 may send commands to a SSE 212, 214, 216, 218, and the SSE may also query the policy server 222 at any time to see what behaviors might be allowed under what circumstances. Policy server 222 may also serve as the primary management console for controlling SSEs. For example, the policy server 222 may be configured to reboot, sterilize and/or send other management commands to the SSEs. In embodiments, the policy server 222 may also enforce certain rules within its policies by acting as a data proxy or source to the SSEs. The administration provided by the policy server 222 may be time driven (i.e., regular updates to policies pushed to SSEs) and/or event driven (i.e. an immediate threat is detected elsewhere in a network and information and new policies may be immediately populated to SSEs that are associated with the policy server 222).

The system security server 220 may also include a policy library 224. In embodiments, the policy library 224 contains a list of what functions each SSE is allowed to perform. Policies may include actions and capabilities controls for different modes of every feature and function of the SSE. For example, a policy may say that no application, process or task without a certain cryptographic signature may be installed, or that once in secure mode, no outside commands are allowed except from a list of trusted SSEs.

The system security server 220 may also include a threat library 226. The threat library 226 contains a list of known threats and a link to an appropriate policy or policies in the policy library 224. Threats may be known rogue servers, applications, processes or tasks known to have vulnerabilities, or SSEs known to have been compromised. The policy server uses the library to both create an interpret policies.

The system security server 220 may also store and transmit cryptographic data, such as cryptographic keys, that pertain to the various SSEs served by the server 220. In embodiments, the system security server 220 may include a key 230 that sends cryptographic keys to and responds to queries for keys, key material, and encipher/decipher messages from the SSEs and the policy server. The system security server 220 may include a key storage 232, which may be a database or memory device, that contains public and private key pairs, including public key storage of SSEs, cryptographic one-time pads, and their ancillary data related to the generation and use of cryptography within the system. The system security server 220 may also include a key policy library 234 that contains policies related to key storage, usage, and revocation.

Figure 3:
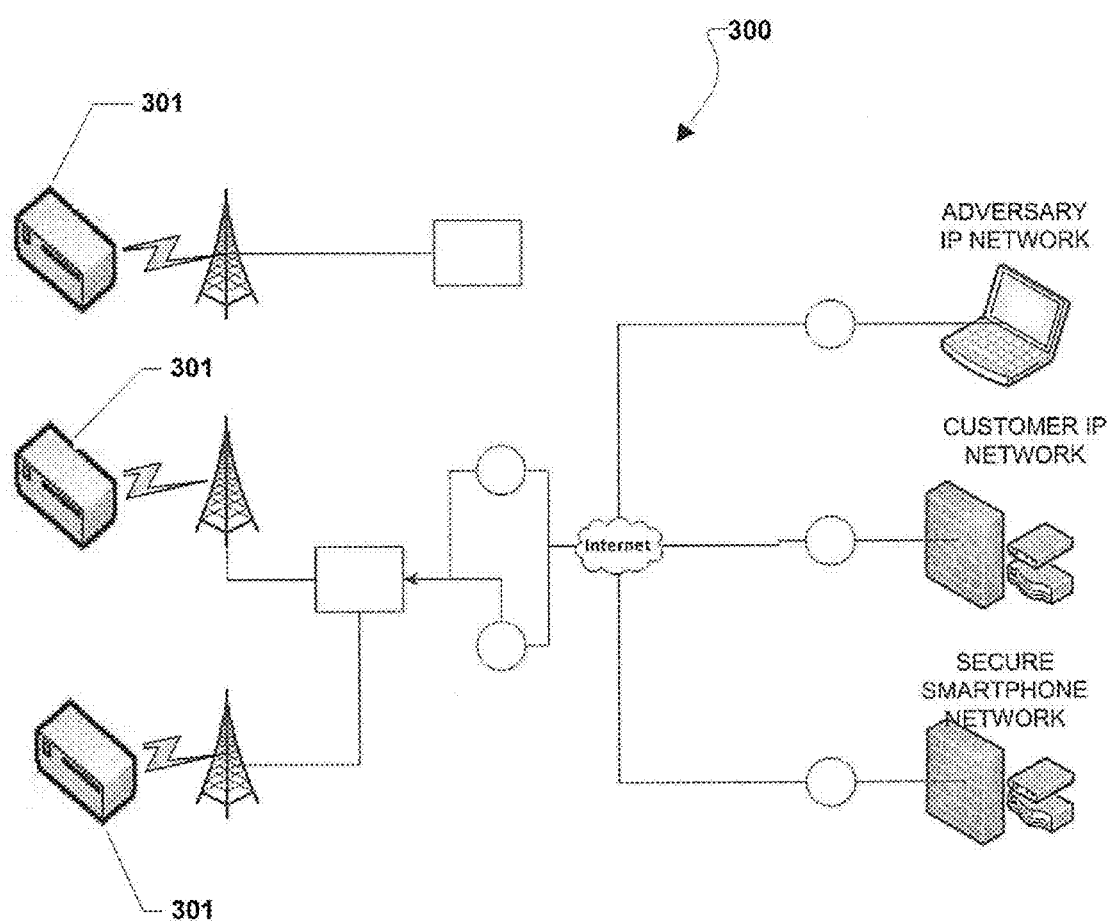
FIG. 3 schematically illustrates a SCADA network architecture.

It should be noted that the SSE may be part of a more complex network 300, including firewalls, routers, and switches, as illustrated in FIG. 3. Thus one or more SSEs 301 may be used in a normal fashion with other existing networks 300 as illustrated in FIG. 3.

In an embodiment, SSEs may operate on desktop operating systems such as Linux or Windows®. In another embodiment, SSEs may operate on Real-time Operating Systems (RTOSs).

The various embodiments of the SSE illustrated herein may apply biomorphic algorithms and adaptations. In the context of the various embodiments of the SSE illustrated herein, biomorphics refers to the adaptation of each individual SSE over time such that each individual SSE or component becomes probabilistically unique over time to create ideal diversity as a defensive or survival technique against security threats that would otherwise jeopardize a network of devices, all of which would be the same. Plus over a period of time, each individual SSE may begin to deviate from the initial deployed configuration and the associated initial condition of the SSE, the longer the individual SSE is running or the more input the individual SSE receives. This has the effect of making each individual SSE unique, so that an attack on one SSE only can compromise that one device, and even then only for a short window of time. The SSEs of the various embodiments illustrated herein apply this concept in some novel ways. Biomorphic algorithms and adaptations may be applied in several ways, ranging from data storage to address mapping as more fully set forth below.

The SSEs of the various embodiments illustrated herein may store data with an encryption key. However, on command or at intervals determined by biomorphic algorithms, which may be stored in the SSE, the SSE may read the data, re-encrypt, and re-store all with a new key. In this fashion, the cryptographic key may be constantly changing. Not even an authorized user has knowledge of the key at any given time. Policies on the SSE determine if the SSE can export the key. Thus with the interaction of the system security monitors, the SSE can self-trigger re-keys and re-stores based on policy violations such as attempts to access certain files from inappropriate domains.

In embodiments, the SSEs may allow configurable mapping between physical and virtual memory within the Isolation Core. While Memory Management Units (MMUs) in processors can fulfill this function, the SSE embodiments herein add an extra layer of mapping as illustrated in FIGS. 4A and 4B.

Figure 4A:
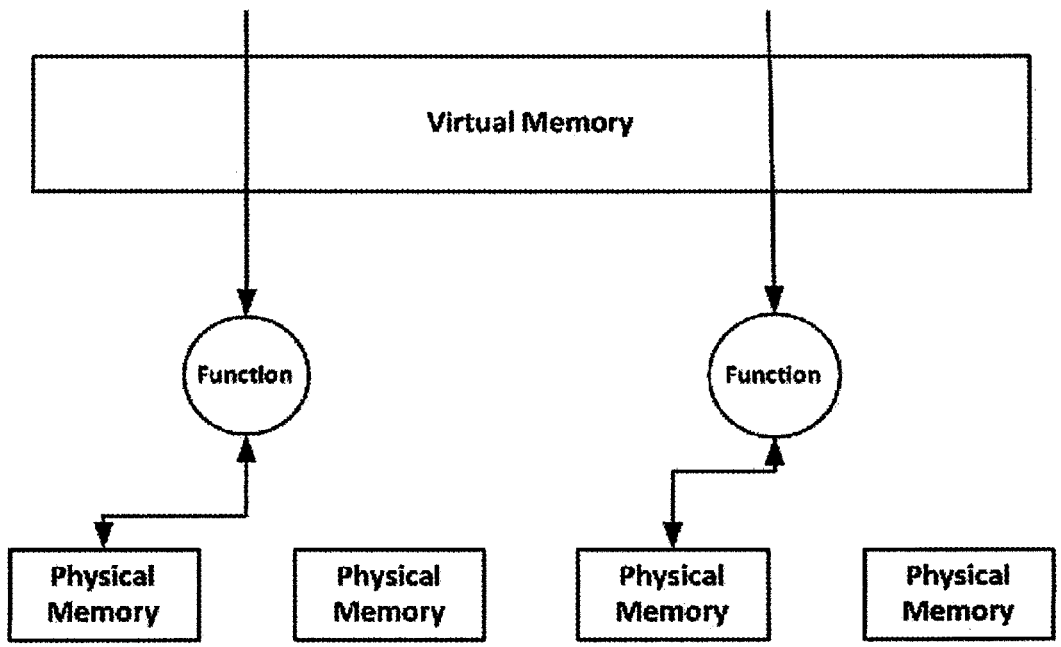
FIGS. 4A and 4B illustrate memory mapping in an embodiment SSE.
Figure 4B:
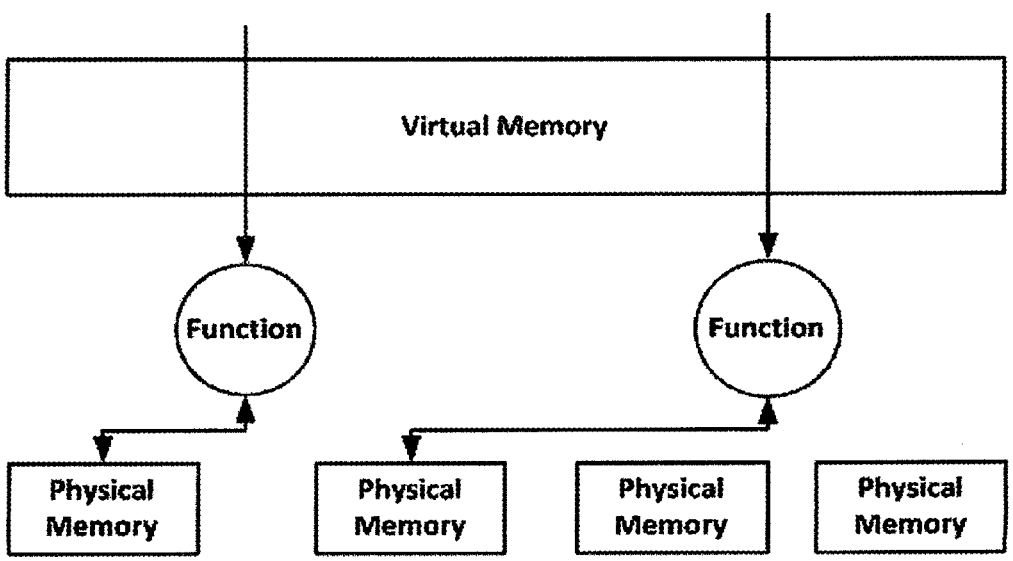

In one embodiment, the protection core 114 may reprogram the MMU from the initial state illustrated in FIG. 4A, and then remap the memory upon a command, policy violation, random interval, or any directive to the state shown in FIG. 4B. When remapping occurs, the original memory can be left intact, allowing multiple processes to appear to share memory, or the SSE can randomize, zeroize, or encrypt the memory for later decryption when the memory is remapped.

With respect to data manipulation and detection, the various SSE embodiments illustrated herein may also transform data to or from a device using keys unique to the individual SSE, and insert that data using steganography (i.e. writing hidden messages in such a way that no one, apart from the sender and intended recipient, suspects the existence of the message) into various data streams. For example, an authenticated user may request that data or commands be uploaded to an authorized SSE or group of SSEs. Encryption may be too processor intensive for small devices, however with servers and SSEs all running constantly changing biomorphic algorithms, they can scramble data in a way unique to each SSE in such a way as to add a layer of covertness to the data in addition to the protection afforded by cryptography.

Figure 5:
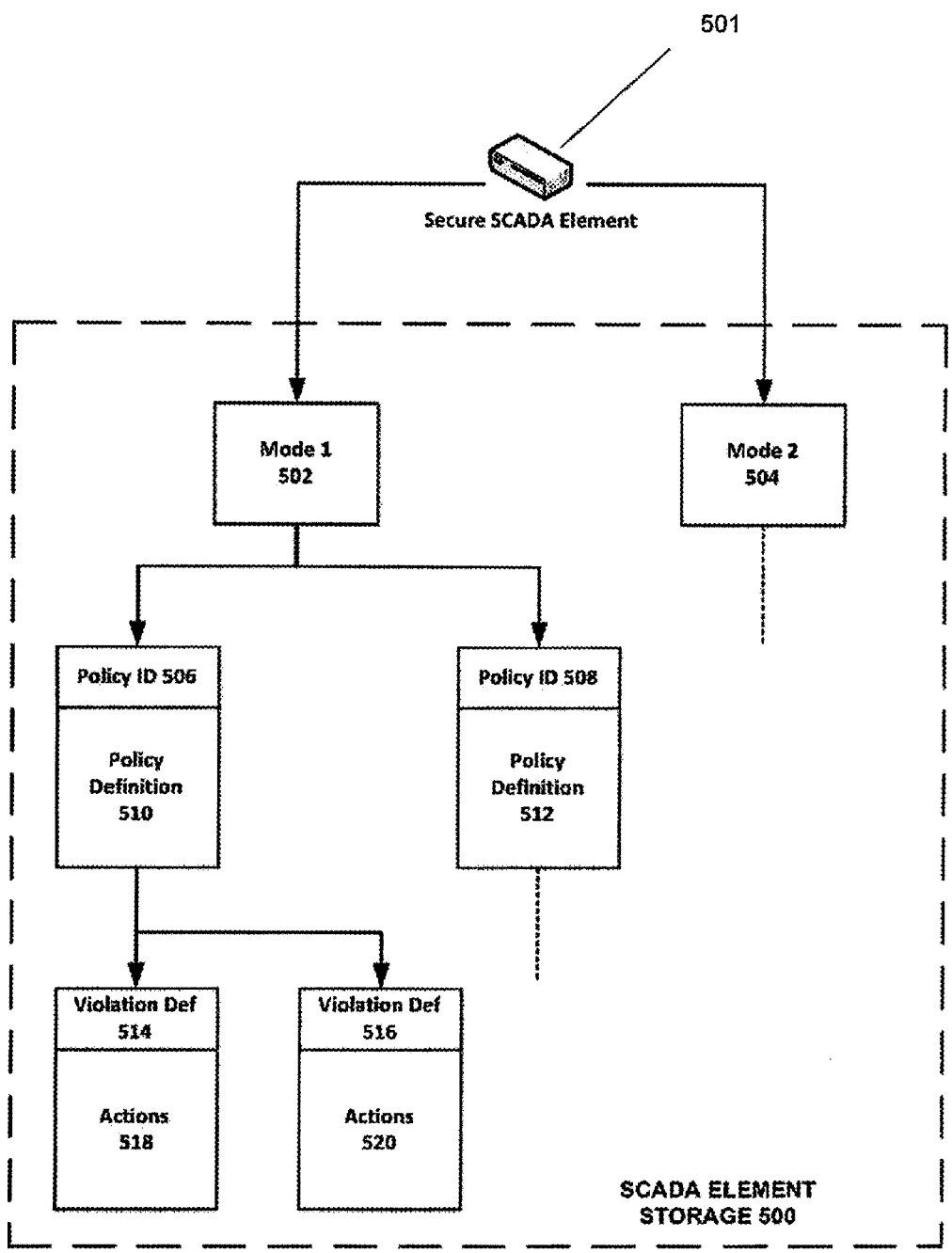
FIG. 5 illustrates tiered security monitor policies on an SSE.

As discussed above, the system security monitor 115 may provide intrusion prevention through mandatory access control and policy enforcement, and detection though attestation and scanning. The security monitor 115 may provide these features through implementation of one or more security monitor policies. As illustrated in FIG. 5, an SSE 501 may include a plurality of security monitor policies which may be tiered, and may be stored on the SSE in a storage media 500, which may be a database.

Each SSE may have an identifier that is unique from all other SSEs in the system. This ID is distinct from other system or manufacturer's IDs (e.g. processor serial numbers, etc.).

The SSEs operate in one or more "modes," 502, 504, which define their current operational policy sets. For example, if the user is a firefighter, during every day use the mode may be "Normal," and policies may allow typical personal use of the SSE just if it were any SSE. The SSE may then receive an authenticated command to place it in "Emergency" mode, and a new set of policies would be in effect. These policies may either be stored on the SSE or downloaded as needed. These emergency polices may allow the SSE to only make secure transfers of data to other known SSEs or otherwise limit or restrict the capabilities of the SSE, for example.

Each security policy may have a unique ID 506, 508, so that policies may be stored in an efficient manner and shared across modes or linked and referenced in other ways. Data transmissions may also include the policy ID so that nodes in a system of SSEs or other devices know what policy all nodes in the system are operating under.

Each security policy may include policy definitions 510, 512, which are detailed descriptions of which processes, applications, and resources can access other processes, applications, and resources. For example, it may define what applications, processes and tasks can be loaded with which signatures. The definition may specify, for instance, that data transmission is disabled for an application, process or task not signed with a particular key, or that virtual address 0x80004000-0x80002000 should map randomly to physical addresses 0x00004000-0x80002000 and 0x00002000-0x00000000, and be zeroized when remapped.

The security policies may also include violation definitions 514, 516. Each violation definition may include an ID and type of violation, which defines the exception types to the policy. For example, these may map to the POSIX or C Standard Library errors, such as 00234a:EFAULT to define an attempt to access a bad address.

Actions definitions 518, 520 define what to do upon levels of violations in the policy. For example, the actions may require that after the first violation, the event is reported to the policy server, and after the second violation the event is reported and the offending application, process or task is disabled for five minutes.

The SSE storage media 500 could be flash or other non-volatile storage on the device, or on a removable media such as a SIM or an SD card.

Figure 6:
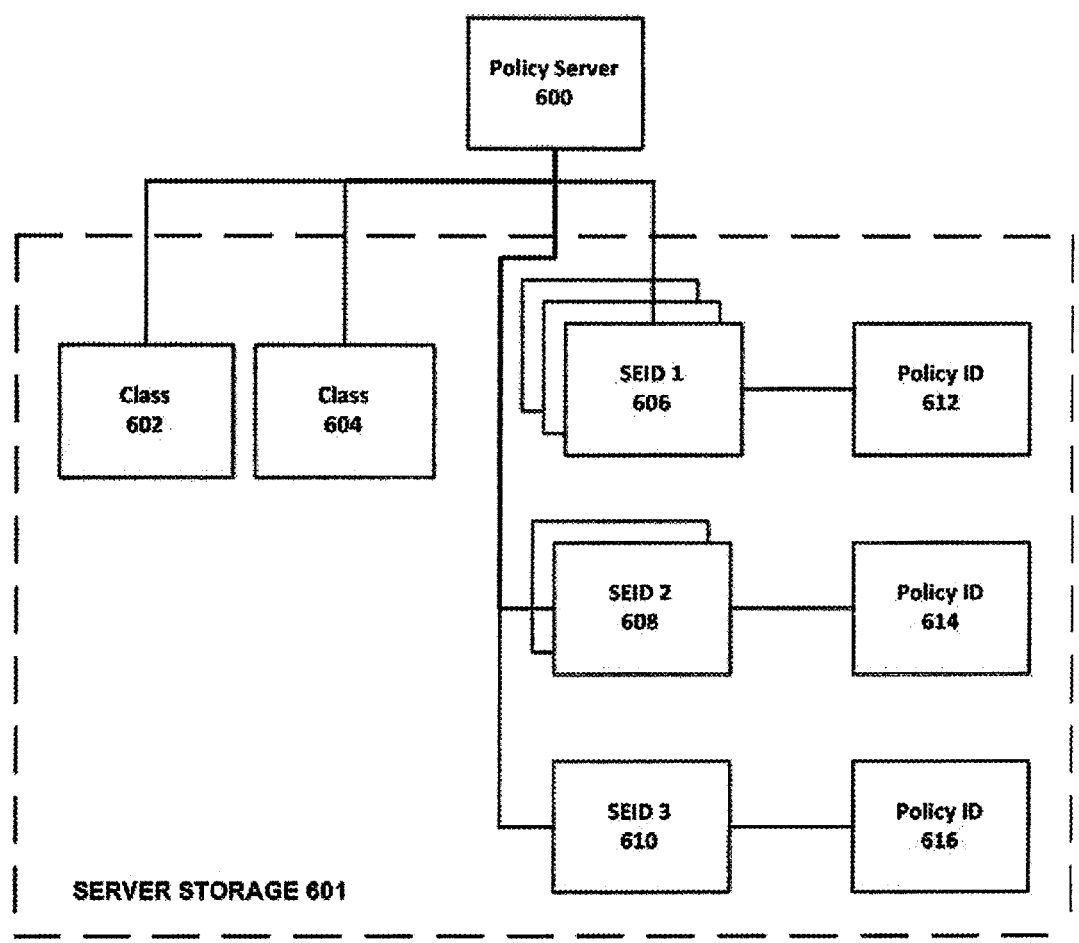
FIG. 6 schematically illustrates the data structure of a security policy server.

FIG. 6 schematically illustrates the policy server data structure, which may closely mimic the storage on the SEE. The policy server 600 may store the data in any non-volatile memory or media such as a hard drive (solid state or magnetic) 601.

The policy server 600 may include classes 602, 604, which are sets of policies and the associated data. For example, the class may be the operational level (normal, emergency, etc.), deployment type (field test, deployed, etc.), time of day, or some combination of these or other criteria.

The policy server 6000 may store SSE IDs, and link them to current policies and status such as any known violations. As illustrated, differing groups of SSE IDs 606, 608, 610, may have differing policies 612, 614, 616 applied to the individual groups and all SSEs in that particular group. This is not meant as a limitation. For example as "group" may have a single SSE in that group with a unique set of policies assigned to it.

Figure 7:
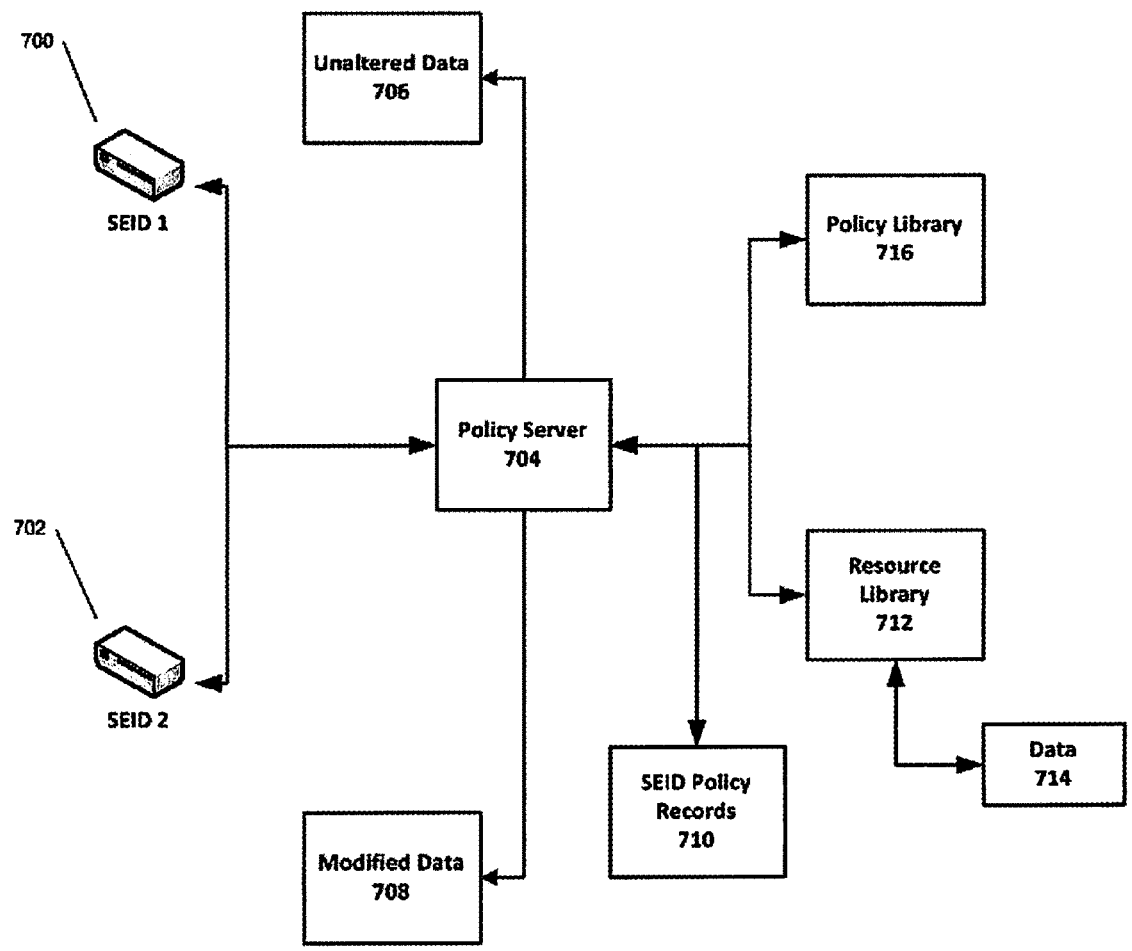
FIG. 7 illustrates a policy-based proxy.

As previously noted, the policy server may also enforce certain rules within these policies by acting as a data proxy or source to the SSEs, or to other equipment in the network. For example, FIG. 7 illustrates a policy-based proxy. In this embodiment, two SSEs 700, 702 make a request for the same data 714. The policy server 704 may access the policy records 710 of the uniquely identified SSEs 700, 702. SSE 700 has no violations of policy, and the policy server 704 allows the SSE 700 to access the data 714 in an unaltered form 706. SSE 702 makes the same request, but the policy server 704, after review of the policy records for the SSE 710, determines that SSE 702 is a potential security risk because, for example, it has failed to report in as specified by its applicable security policy, or has reported multiple policy violations recently without inspection by an administrator, etc. The policy server 704, therefore, may deliver a modified version of the data 708 that is appropriate to the current server-side policy associated with the SSE. The various polices may be held in the Policy Library 716.

In various embodiments, the security policies limit the capabilities of SSEs by defining what features, functions, and resources a SSE can access. Policies are not limited in their definition, but in general each entry in a policy may be grouped into the following areas:

Control IO: These policy entries may define what devices the SSE can communicate with. For example, if a SSE consists of a battery which powers a processor that controls a motor based on sensor data, the control IO policy entries can block or allow the processor access to the motor and sensor, and define boundaries and low-level technical limits for such communication such as address ranges in the hardware, and it may contain minimum battery firmware or voltage requirements. Essentially these policy entries are internal to the SSE or SSE operation.

Management IO: These entries may define how SSEs communicate to each other and to the management components of a secure SCADA system. For example, they may define VPN or other networking settings, as well as attestation or encryption requirements to ensure SSEs only communicate to other authorized SSEs.

Limits and definitions: These entries may set limits for the SSEs devices, such as maximum voltage applied or maximum time between switches of a relay. Such limits may not be built into the firmware of the SSEs, but may be important considerations later, and may change depending on the situation or environmental factors.

Transitions: These entries may define how and under what conditions a security policy becomes active on the SSE. For example, a policy may not surrender control to a different policy unless the SSE attempts to apply a newer or higher priority policy, or may accept a command to change policy only from a certain policy server, etc.

In embodiments, only one security policy is active at any one time on a SSE. As previously indicated SSEs obtain policies from a policy server, but they can also obtain them virally from other SSEs. Many SSEs are small devices that have no direct communication with the policy server, but are instead part of a mesh or ad-hoc network. The policy server may still reach these SSEs by updating a global policy, and then any SSE that communicates with an updated SSE may receive and apply the update. In embodiments, commands to change which policy is in effect can come from anywhere, and can be spread through the same viral mechanism as the policies themselves.

The protection core 114 (FIG. 1) may provide and enforce strong separation between trusted and untrusted elements, and may provide an execution framework for high robustness elements of the secure SCADA system architecture on the SSE. In embodiments, the protection core 114 works by securely isolating elements into individual isolation contexts. The protection core may have complete and sole control of the underlying hardware and may be the only software running in privileged mode in the OS kernel. Each context partitions and multiplexes this hardware between any other software on the SSE system as required, from high level OSs down to individual applications and drivers. Benefits of this architecture include:

A very small trusted computing base in the intermediate isolation cores functions to ease certification and limit opportunities for malicious code exploitation;

Unmodified deployment of existing off-the-shelf open OSs and software stacks in their own isolated contexts;

MAC-based Security;

Defense against malware and security among contexts through isolation and use of restricted inter-context communications (IPC) APIs;

Fast inter-process communication (IPC) mechanisms for high performance; and

Resistance to DoS attacks through monitoring, prioritization, and load balancing among contexts.

To the extent that software patches need to be installed, they may originate from a system security server. Upon download to the SSE, they may be signed and authenticated by the SSE and subsequently approved and validated by the system security.

A SSE may also be capable of receiving media using different protocols, for example the The Secure Real-time Transport Protocol (or SRTP).

Each communicating system entity (i.e., applications, processes, or remote systems) may be identified by an entity identifier that is unique within the domain of the SSE or the secure SCADA network to which the system entity is connected. For example, applications, processes and tasks must each have unique IDs, but high-side subsystems may also each have unique IDs within the SSE if they communicate to other subsystems on the SSE, or within the entire system if they communicate outside the SSE. Identities may be formed from combinations of other identities in a hierarchical fashion as long as uniqueness is not compromised.

In embodiments, the secure SCADA system supports Advanced Encryption Standard (AES) per FIPS PUB 197 with keys sizes of 128, 192, and 256 bits. However, this is not meant as a limitation. Other encryption capabilities may also be supported if needed.

The secure SCADA system may also employ the Ephemeral Unified Model and the One-Pass Diffie Hellman (referred to as ECDH), NIST Special Publication 800-56A (using the curves with 256 and 384-bit prime moduli) for cryptographic key exchange. For digital signatures, the SSE may support Elliptic Curve Digital Signature Algorithm (ECDSA) per FIPS PUB 186-3 (using the curves with 256 and 384-bit prime moduli). Further the SSE may implement Secure Hash Algorithm (SHA) per FIPS PUB 180-3 (using SHA-256 and SHA-384). Additionally the secure SCADA system may be configured to generate key pairs, emit public key components, and store or derive previously-used key pairs securely.

Embodiment methods and systems for providing a secure SCADA system may utilize any of the features disclosed in commonly-owned U.S. patent application Ser. No. 13/323,340, filed Dec. 12, 2011 by Üner et al., entitled "Systems and Methods for Enhanced Security in Wireless Communication," the entire contents of which is incorporated herein by reference. Furthermore, various components of the secure SCADA system, including secure SCADA elements (SSEs) may utilize a secure operating system kernel as disclosed in commonly-owned U.S. patent application Ser. No. 13/315,531, filed Dec. 9, 20011 by Üner et al., entitled "Systems and Methods for Providing a Computing Device Having a Secure Operating System Kernel," the entire contents of which is incorporated herein by reference.

A system and method for establishing a secure SCADA system has now been illustrated. It will be apparent to those of ordinary skill in the art that other embodiments and architectures may be implemented without departing from the scope of the inventions as illustrated.

The foregoing method descriptions and diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A method of operating a Supervisory Control and Data Acquisition (SCADA) element in a first security mode defined by a first security policy, the SCADA element included in a SCADA system, comprising:
monitoring applications, processes, and tasks that access a processor of the SCADA element by a SCADA element security monitor that is unique to the SCADA element and is distinct from a system security monitor that is associated with a system security server of the SCADA system, wherein the SCADA element security monitor monitors the SCADA element alone in a manner unique to the SCADA element security monitor while the system security monitor monitors each SCADA element included in the SCADA system via the system security server, wherein the SCADA element security monitor is configured to detect malicious code that is uniquely tailored to attack the SCADA element, and wherein the system security monitor alone is insufficient in detecting the malicious code;
determining one or more violations of the first security policy by a violating application, process, or task associated with the malicious code that accesses the processor of the SCADA element the determining being performed by the SCADA element security monitor unique to the SCADA element, wherein the first security policy is stored on the SCADA element and is unique to the SCADA element and wherein the first security policy is configured to trigger a graduated action that is customized to prevent the malicious code from tampering with the processor of the SCADA element; and
taking the graduated action pursuant to the first security policy in response to the detection of one or more violations of the first security policy.

2. The method of claim 1, wherein the SCADA element comprises one or more of a supervisory computer system, a programmable logic controller, a remote terminal unit, and a human-machine interface.

3. The method of claim 1, wherein taking the graduated action comprises one or more of: ignoring the violation, logging the violation, informing a system security server of the violation, shutting down at least one of the violating applications, processes, or tasks on the SCADA element, erasing data from the SCADA element, encrypting data on the SCADA element, disabling the SCADA element, and shutting down or rebooting the SCADA system containing the SCADA element.

4. The method of claim 1, further comprising:
determining whether the determined violation exceeds a threshold number of violations; and
taking the second graduated action pursuant to the first security policy when the determined violation exceeds the threshold number of violations.

5. The method of claim 1, wherein taking the graduated action comprises:
transmitting information relating to the determined violation to the system security server;
receiving a command from the system security server to take one or more further actions in response to the determined violation; and
taking the graduated action.

6. The method of claim 1, further comprising:
transmitting information relating to at least one of the applications, processes, or tasks to the system security server;
receiving a message from the system security server that at least one of the applications, processes, or tasks is determined to be trusted or untrusted; and
monitoring at least one of the applications, processes, or tasks based on the determination as trusted or untrusted, wherein an untrusted application, process, or task is monitored at a higher level of scrutiny than a trusted application, process, or task.

7. The method of claim 6, wherein all of the applications, processes and tasks are monitored as untrusted until all of the applications, processes and tasks are determined to be trusted by the system security server.

8. The method of claim 1, further comprising:
monitoring an operating system kernel of the SCADA element;
determining one or more violations of the first security policy by the operating system kernel; and
taking the graduated action pursuant to the first security policy in response to the detection of one or more violations of the first security policy by the operating system kernel.

9. The method of claim 1, further comprising:
receiving a new or updated security policy that is unique to the SCADA element from at least one of the system security server and another SCADA element;
monitoring applications, processes and tasks that access the processor of the SCADA element by the SCADA element system monitor; and
determining one or more violations of the new or updated security policy in response to the detection of one or more violations.

10. The method of claim 1, further comprising:
storing data on the SCADA element that has been encrypted using a first encryption key;
reading the stored data;
re-encrypting the data using a second encryption key; and
storing the data on the SCADA element that has been encrypted using the second encryption key.

11. The method of claim 10, wherein the data is read and re-encrypted at intervals determined using a biomorphic algorithm.

12. The method of claim 11, further comprising:
mapping addresses between a virtual memory and a physical memory on the SCADA element; and
re-mapping the addresses to different memory locations, wherein at least one of the different memory locations and the interval between re-mappings is determined using the biomorphic algorithm.

13. The method of claim 9, further comprising:
switching from the first security mode defined by the first security policy to a second security mode defined by a second security policy that is unique to the SCADA element and is distinct from the system security monitor that is associated with the system security server;
monitoring applications, processes, and tasks that access the processor of the SCADA element by the SCADA element security monitor;
determining one or more violations of the second security policy by a violating application, process, or task that accesses the processor of the SCADA element by the SCADA element security monitor; and
taking an additional graduated action pursuant to the second security policy in response to the detection of one or more violations of the second security policy.

14. The method of claim 13, further comprising:
storing a plurality of security policies in a security policy library included in the system security server that is associated with the SCADA system; and
transmitting by the system security sever all or a portion of at least one security policy to at least one SCADA element included in the SCADA system over a communication network.

15. The method of claim 14, wherein each of the plurality of security policies include limits on the capabilities of one or more SCADA elements from the group consisting of: a Control IO, Management IO, controlling devices associated with each SCADA element, and transitioning between the first security policy and the second security policy.

16. The method of claim 14, further comprising:
storing cryptographic material associated with a plurality of SCADA elements; and
transmitting cryptographic material to at least one SCADA element over the communication network.

17. A secure Supervisory Control and Data Acquisition (SCADA) element that operates in a first security mode defined by a first security policy, the SCADA element included in a SCADA system, comprising:
a processor configured with executable instructions to perform operations, the executable instructions comprising:
monitoring applications, processes, and tasks that access the processor by a SCADA element security monitor that is unique to the processor of the SCADA element and is distinct from a system security monitor that is associated with a system security server of the SCADA system, wherein the SCADA element security monitor monitors the SCADA element alone in a manner unique to the SCADA element security monitor while the system security monitor monitors each SCADA element included in the SCADA system via the system security server, wherein the SCADA element security monitor is configured to detect malicious code that is uniquely tailored to attack the SCADA element and wherein the system security monitor alone is insufficient in detecting the malicious code;
determining one or more violations of the first security policy by a violating application, process, or task associated with the malicious code that accesses the processor of the SCADA element the determining being performed by the SCADA element security monitor unique to the SCADA element, wherein the first security policy is stored on the SCADA element security monitor and is unique to the SCADA element and wherein the first security policy is configured to trigger a graduated action that is customized to prevent the malicious code from tampering with the processor of the SCADA element; and
taking the graduated action pursuant to the first security policy in response to the detection of one or more violations of the first security policy.

18. The SCADA element of claim 17, wherein the SCADA element comprises one or more of a supervisory computer system, a programmable logic controller, a remote terminal unit, and a human-machine interface.

19. The SCADA element of claim 17, wherein the graduated action is selected from a group consisting of: ignoring the violation, logging the violation, informing a system security server of the violation, shutting down at least one of the violating applications, processes or tasks on the SCADA element, disabling the SCADA element from the SCADA system, shutting down the SCADA element, rebooting the SCADA element, and shutting down or rebooting the SCADA system containing the SCADA element.

20. The SCADA element of claim 17, wherein the executable instructions further comprise:
transmitting information relating to the determined violation to the system security server;

receiving a command from the system security server to take one or more further actions in response to the determined violation; and
taking the graduated action.

21. The SCADA element of claim 17, wherein the executable instructions further comprise:
    transmitting information relating to the at least one of the applications, processes, or tasks to the system security server;
    receiving a message from the system security server that at least one of the applications, processes, or tasks is determined to be trusted or untrusted; and
    monitoring the at least one of the applications, processes, or tasks based on the determination as trusted or untrusted, wherein an untrusted application, process, or task is monitored at a higher level of scrutiny than a trusted application, process, or task.

22. The SCADA element of claim 21, wherein the executable instructions further comprise:
    receiving a message from the system security server and another SCADA element updating a status of the application, process or task from untrusted to trusted or from trusted to untrusted.

23. The SCADA element of claim 17, wherein the executable instructions further comprise:
    receiving a new or updated security policy that is unique to the SCADA element from at least one of the system security server and another SCADA element;
    determining one or more violations of the new or updated security policy by the violating application, process or task; and
    taking the graduated action pursuant to the new or updated security policy in response to the detection of one or more violations.

24. The SCADA element of claim 17, wherein the executable instructions further comprise:
    storing the data on the SCADA element that has been encrypted using a first encryption key;
    reading the stored data;
    re-encrypting the data using a second encryption key; and
    storing the data on the SCADA element that has been encrypted using the second encryption key, wherein the data is read and re-encrypted at intervals determined using a biomorphic algorithm.

25. The SCADA element of claim 24, wherein the executable instructions further comprise:
    mapping addresses between a virtual memory and a physical memory on the SCADA element; and
    re-mapping the addresses to different memory locations, wherein at least one of the different memory locations and interval between re-mappings is determined using the biomorphic algorithm.

26. The SCADA element of claim 23, wherein the executable instructions further comprise:
    switching from the first security mode defined by the first security policy to a second security mode defined by the second security policy that is unique to the SCADA element and is distinct from the system security monitor that is associated with the system security server;
    monitoring applications, processes and tasks that access the processor of the SCADA element by the SCADA element security monitor;
    determining one or more violations of the second security policy by a violating application, process or task that accesses the processor of the SCADA element by the SCADA element security monitor; and
    taking an additional graduated action pursuant to the second security policy in response to the detection of one or more violations of the second security policy.

27. The SCADA element of claim 17, wherein the executable instructions further comprise:
    determining whether the determined violation exceeds a threshold number of violations; and
    taking a second graduated action pursuant to the first security policy when the determined violation exceeds the threshold number of violations.

28. The SCADA element of claim 17, wherein the executable instructions further comprise:
    monitoring an operating system kernel of the SCADA element;
    determining one or more violations of the first security policy by the operating system kernel; and
    taking the graduated action pursuant to the first security policy in response to the detection of one or more violations of the first security policy by the operating system kernel.

* * * * *

UNITED STATES PATENT AND TRADEMARK OFFICE
CERTIFICATE OF CORRECTION

PATENT NO.         : 9,298,917 B2
APPLICATION NO.    : 13/350599
DATED              : March 29, 2016
INVENTOR(S)        : Eric Ridvan Üner et al.

It is certified that error appears in the above-identified patent and that said Letters Patent is hereby corrected as shown below:

Specification
Column 1, Line 40-41, "control to the" should read --control the--
Column 2, Line 20-21, "memory a processor" should read --memory or a processor--
Column 3, Line 29-30, "may be an comprised" should read --may be comprised--
Line 43, "connections the network" should read --connections with the network--
Column 8, Line 2, "create an Interpret" should read --create and interpret--
Colum 9, Line 37, "just if it" should read --just as if it--
Column 10, Line 11, "on the SEE" should read --on the SSE--
Column 12, Line 25, "entire contents" should read --entire content--
Line 32, "entire contents" should read --entire content--
Line 35, "has now" should read --have now--
Claims
Claim 1, Column 14, Line 21, "SCADA element the" should read --SCADA element, the--
Claim 14, Column 15, Line 64, "security sever" should read --security server--
Claim 15, Column 16, Line 2, "include limits" should read --includes limits--
Claim 17, Column 16, Line 37, "SCADA element the" should read --SCADA element, the--

Signed and Sealed this
Nineteenth Day of July, 2016

Michelle K. Lee
*Director of the United States Patent and Trademark Office*